US011614278B2

(12) United States Patent
Han et al.

(10) Patent No.: US 11,614,278 B2
(45) Date of Patent: Mar. 28, 2023

(54) INTELLIGENT INSPECTION DEVICE AND REFRIGERATOR WITH THE SAME

(71) Applicant: LG ELECTRONICS INC., Seoul (KR)

(72) Inventors: Junsoo Han, Seoul (KR); Younghun Yang, Seoul (KR); Yonghwan Eom, Seoul (KR); Junseong Jeong, Seoul (KR); Cholok Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 692 days.

(21) Appl. No.: 16/685,144

(22) Filed: Nov. 15, 2019

(65) Prior Publication Data

US 2020/0096253 A1 Mar. 26, 2020

(30) Foreign Application Priority Data

Aug. 15, 2019 (KR) .......................... 10-2019-0099974

(51) Int. Cl.
*F25B 49/00* (2006.01)
*F25D 29/00* (2006.01)
(Continued)

(52) U.S. Cl.
CPC .......... *F25D 29/006* (2013.01); *F25B 49/005* (2013.01); *G05B 13/0265* (2013.01);
(Continued)

(58) Field of Classification Search
CPC ............... F25B 2500/12; F25B 49/005; G05B 13/0265; G10L 25/30
See application file for complete search history.

(56) References Cited

U.S. PATENT DOCUMENTS

| 2002/0095269 A1* | 7/2002 | Natalini | H04L 43/0817 |
| | | | 702/188 |
| 2009/0285409 A1* | 11/2009 | Yoshizawa | G01S 3/8083 |
| | | | 381/92 |
| 2015/0279181 A1* | 10/2015 | Park | G08B 13/1672 |
| | | | 367/136 |

FOREIGN PATENT DOCUMENTS

| JP | 2016007800 A | * | 1/2016 |
| JP | 2019142634 A | * | 8/2019 |

(Continued)

*Primary Examiner* — Vincent H Tran
(74) *Attorney, Agent, or Firm* — Lee Hong Degerman Kang & Waimey

(57) ABSTRACT

An intelligent inspection device is disclosed. The intelligent inspection device comprising a sound collection collecting a first operation sound generated in a refrigerator and storing the collected first operating sound a reference sound set-up comparing the first operation sound stored in the sound collection with a preset normal sound of the refrigerator, learning a result of the comparison to set a reference sound, and setting a reference sound range based on the set reference sound and a processor collecting, through the sound collection, a second operation sound generated in the refrigerator after the reference sound range has been set, comparing the second operation sound with the reference sound range, and inspecting whether the refrigerator fails based on the result of the comparison. According to the intelligent inspection device or the artificial intelligent refrigerator of the present disclosure, one or more of a user terminal, and a server of the present disclosure may be associated with an artificial intelligence module, a drone ((Unmanned Aerial Vehicle, UAV), a robot, an AR (Augmented Reality) device, a VR (Virtual Reality) device, a device associated with 5G services, etc.

27 Claims, 11 Drawing Sheets

(51) Int. Cl.
    *G10L 25/51*         (2013.01)
    *G10L 21/0232*    (2013.01)
    *G08B 21/18*       (2006.01)
    *G05B 13/02*       (2006.01)
    *G05B 23/02*       (2006.01)
    *H04W 72/04*      (2023.01)

(52) U.S. Cl.
    CPC ......... *G05B 23/024* (2013.01); *G08B 21/182* (2013.01); *G10L 21/0232* (2013.01); *G10L 25/51* (2013.01); *H04W 72/0413* (2013.01); *F25B 2500/12* (2013.01); *F25D 2400/36* (2013.01)

(56) References Cited

FOREIGN PATENT DOCUMENTS

| | | | | |
|---|---|---|---|---|
| JP | 2019184341 A | * | 10/2019 | |
| WO | WO-2014073427 A1 | * | 5/2014 | ............ F25B 49/005 |

\* cited by examiner (a)

Noise diagnosis result

Noise Cause: The pipe of the machine room at the bottom of the refrigerator is touching, causing trembling noise.

Do you agree to proceed with the request for repair by a service technician?

[ Yes ]   [ No ]

INTELLIGENT INSPECTION DEVICE AND REFRIGERATOR WITH THE SAME

CROSS-REFERENCE TO RELATED APPLICATIONS

Pursuant to 35 U.S.C. § 119(a), this application claims the benefit of earlier filing date and right of priority to Korean Patent Application No. 10-2019-0099974, filed on Aug. 15, 2019, the contents of which are hereby incorporated reference herein in its entirety.

BACKGROUND OF THE INVENTION

Field of the invention

The present disclosure relates to an intelligent inspection device and a refrigerator with the same, and more particularly, to an intelligent inspection device and a refrigerator with the same, capable of collecting noise generated in the refrigerator, comparing the collected noise with a normal operation sound to learn the comparison with artificial intelligence (AI) and inspecting whether the refrigerator fails based on the AI learning result.

Related Art

Generally, a refrigerator includes a plurality of pumps and motors. The refrigerator continuously using the plurality of pumps and motors is exposed to the risk of failure, and the longer a continuous use time, the higher risk of failure the refrigerator has.

A follow-up after a refrigerator failure not only requires high cost, but also causes inconvenience in that it cannot be used when needed. Accordingly, a failure prediction technology for predicting a failure of a refrigerator in advance is being increasingly interested.

However, common failure prediction has been made by those skilled in the field of the refrigerator or by using complicated and expensive devices. For this reason, there has been a problem that the ordinary person may not easily inspect whether the product fails

SUMMARY OF THE INVENTION

An object of the present disclosure is to solve the problems described above.

Furthermore, an object of the present disclosure is to provide an intelligent inspection device and a refrigerator with the same, capable of collecting noise generated in the refrigerator, comparing the collected noise with a normal operation sound to learn the comparison with artificial intelligence (AI) and inspecting whether the refrigerator fails based on the AI learning result.

In one aspect, there is provided an intelligent inspection device comprising a sound collecting unit collecting a first operation sound generated in a refrigerator and storing the collected first operating sound a reference sound set-up comparing the first operation sound stored in the sound collecting unit with a preset normal sound of the refrigerator, learning a result of the comparison to set a reference sound, and setting a reference sound range based on the set reference sound and a processor collecting, through the sound collecting unit, a second operation sound generated in the refrigerator after the reference sound range has been set, comparing the second operation sound with the reference sound range, and inspecting whether the refrigerator fails based on the result of the comparison.

The intelligent inspection device may further comprise a noise removing unit removing noise from the first operation sound or the second operation sound collected through the sound collecting unit.

The processor may be configured to extract a frequency characteristic of the first operation sound or the second operation sound; and control the noise removing unit such that the noise is removed from the first operation sound or the second operation sound based on the extracted frequency characteristic.

The intelligent inspection device may further comprise a communication unit connecting communication with a designated server through a network, transmitting a result of the inspection by the processor to the server, and feeding back corresponding determination from the server.

The first operation sound of the refrigerator may be a sound collected for a predetermined time after being first installed or re-installed in a home.

The first operation sound of the refrigerator may be at least one of a tremor sound generated in a machine room installed in the refrigerator, a compressor sound generated by a compressor mounted on the refrigerator, refrigerant sound flowing through a pipe mounted on the refrigerator, and a fan sound generated by a fan mounted on the refrigerator.

The processor may be configured to set the frequency characteristic to be different according to a distance from the refrigerator.

The processor may be configured to determine that the refrigerator fails when the second operation sound is out of the reference sound range; and transmit the result of the inspection to the server through the communication unit and feedback corresponding determination.

The processor may be configured to determine that the refrigerator fails when the second operation sound is out of the reference sound range; and execute a failure inspection program to display the determination corresponding to the result of the inspection.

The processor may be configured to transmit the result of the inspection to the server through the communication unit and feed back the corresponding determination when the determination is not retrieved from the failure inspection program.

The processor may be configured to receive, from a network, downlink control information (DCI) to be used for scheduling transmission of information on the result of the inspection performed by the intelligent inspection device; and transmit the information on the result of the inspection to the network based on the DCI.

The processor may be configured to perform an initial access procedure with the network based on a synchronization signal block (SSB); and transmit information on the result of the inspection to the network through a physical uplink shared channel (PUSCH), and wherein demodulation reference signals (DM-RS) of the SSB and the PUSCH are quasi co-located (QCLed) for QCL type D.

The processor may be configured to control a communication unit to transmit the information on the result to an artificial intelligent (AI) processor in the network; and control the communication unit to receive AI processing information from the AI processor, and wherein the AI processing information is information indicating that any one of a failure state of the refrigerator or an abnormality state of the refrigerator is determined.

In another aspect, there is provided a refrigerator comprising a main body including a fridge compartment and a freezer compartment; and an intelligent inspection device mounted on the main body and inspecting whether the fridge compartment or the freezer compartment fails by collecting a first operation sound or a second operation sound generated in the fridge compartment or the freezer compartment, and learning the collected first operation sound or second operation sound, and analyzing the comparison, wherein the intelligent inspection device includes: a sound collection unit collecting a first operation sound generated in a refrigerator and storing the collected first operating sound; a reference sound setting unit comparing the first operation sound stored in the sound collecting unit with a preset normal sound of the refrigerator, learning a result of the comparison to set a reference sound, and setting a reference sound range based on the set reference sound; and a processor collecting, through the sound collecting unit, a second operation sound generated in the refrigerator after the reference sound range is set, comparing the second operation sound with the reference sound range, and inspecting whether the refrigerator fails based on the result of the comparison.

The refrigerator may further includes a noise removing unit removing noise from the first operation sound or the second operation sound collected through the sound collecting unit.

The processor may be configured to extract a frequency characteristic of the first operation sound or the second operation sound; and control the noise removing unit such that the noise is removed from the first operation sound or the second operation sound based on the extracted frequency characteristic.

The refrigerator may further includes a communication unit connecting communication with a designated server through a network, transmitting a result of the inspection by the processor to the server, and feeding back corresponding determination from the server.

The first operation sound of the refrigerator may be a sound collected for a predetermined time after being first installed or re-installed in a home.

The first operation sound of the refrigerator may be at least one of a tremor sound generated in a machine room installed in the refrigerator, a compressor sound generated by a compressor mounted on the refrigerator, a refrigerant sound flowing through a pipe mounted on the refrigerator, and a fan sound generated by a fan mounted on the refrigerator.

The processor may be configured to set the frequency characteristic to be different according to a distance from the refrigerator.

The processor may be configured to determine that the refrigerator fails when the second operation sound is out of the reference sound range; and transmit the result of the inspection to the server through the communication unit and feed back the corresponding determination.

The processor may be configured to determine that the refrigerator fails when the second operation sound is out of the reference sound range; and execute a failure inspection program to display the determination corresponding to the result of the inspection.

The processor may be configured to transmit the result of the inspection to the server through the communication unit and feed back the corresponding determination when the determination is not retrieved from the failure inspection program.

The processor may be configured to receive, from a network, downlink control information (DCI) to be used for scheduling transmission of information on the result of the inspection performed by the intelligent inspection device; and transmit the information on the result of the inspection to the network based on the DCI.

The processor may be configured to perform an initial access procedure with the network based on a synchronization signal block (SSB); and transmit information on the result of the inspection to the network through a physical uplink shared channel (PUSCH), wherein demodulation reference signals (DM-RS) of the SSB and the PUSCH are quasi co-located (QCLed) for QCL type D.

The processor may be configured to control a communication unit to transmit the information on the result to an artificial intelligent (AI) processor in the network; and control the communication unit to receive AI processing information from the AI processor, and wherein the AI processing information is information indicating that any one of a failure state of the refrigerator or an abnormality state of the refrigerator is determined.

The intelligent inspection device may collect the second operation sound through the sound collecting unit when a note-on function is turned-on in the refrigerator.

Effects of the intelligent inspection device and the refrigerator with the same according to the present disclosure are as follows.

The present disclosure may improve the service by collecting noise generated in the refrigerator, comparing the collected noise with a normal operation sound to learn the comparison with AI and inspecting whether the refrigerator fails based on the AI learning result.

The present disclosure may significantly reduce inconvenience of the customer by collecting noise generated in the refrigerator, comparing the collected noise with a normal operation sound to learn the comparison with AI and inspecting whether the refrigerator fails based on the AI learning result.

BRIEF DESCRIPTION OF THE DRAWINGS

FIG. 11 is a diagram for describing a result display of inspection according to the embodiment of the present disclosure.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
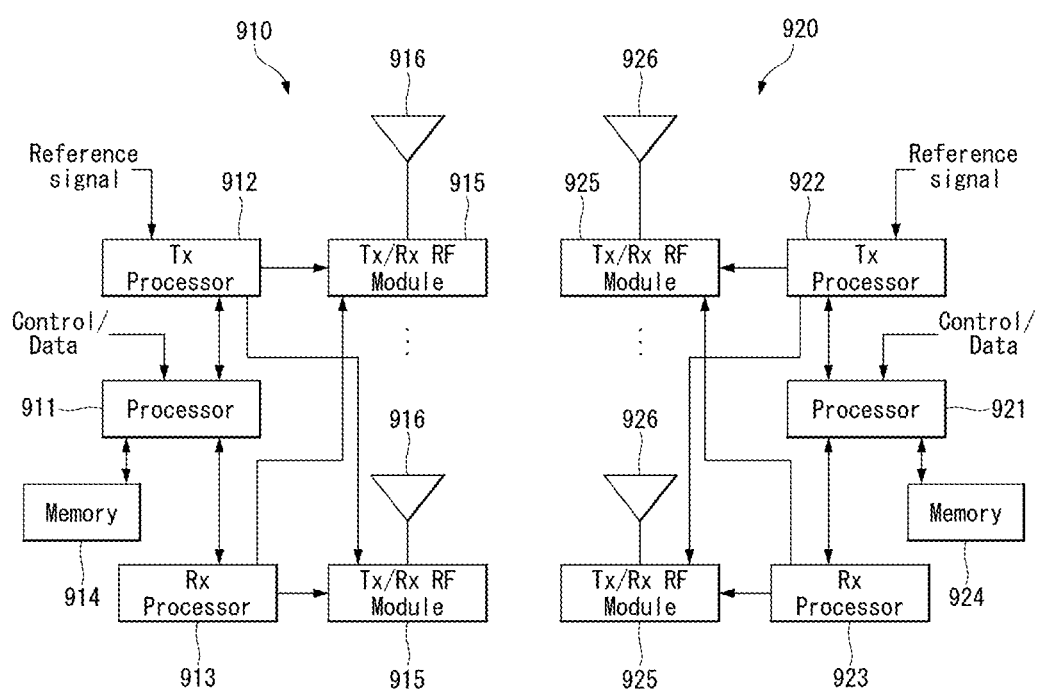
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
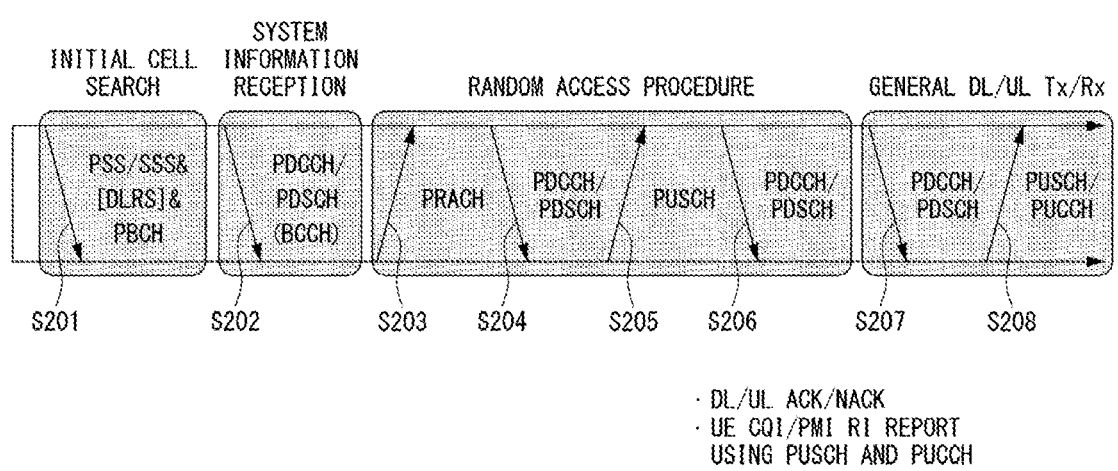
FIG. 2 is a diagram showing an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB -ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLE BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Intelligent Refrigerators Using 5G Communication

Figure 3:
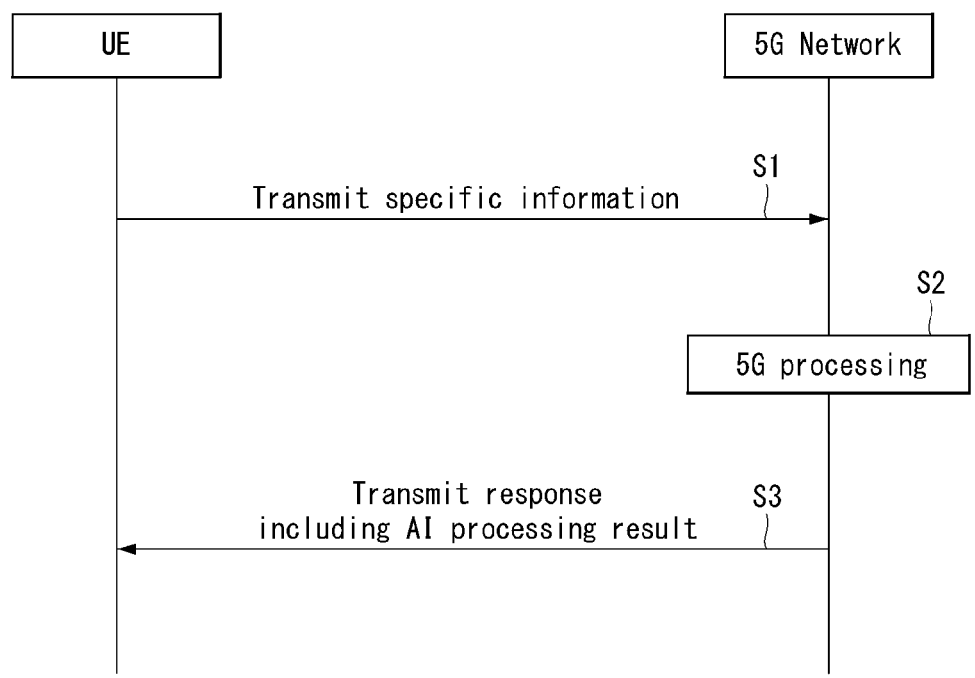
FIG. 3 shows an example of basic operations of a user equipment and a 5G network in a 5G communication system.

FIG. 3 shows an example of basic operations of an intelligent refrigerator and a 5G network in a 5G communication system.

The intelligent refrigerator transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the intelligent refrigerator (S3).

G. Applied Operations Between Intelligent Refrigerator and 5G Network in 5G Communication System Hereinafter, the operation of an intelligent refrigerator using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the intelligent refrigerator performs an initial access procedure and a random access procedure with the 5G network prior to step S1 of FIG. 3 in order to transmit/receive signals, information and the like to/from the 5G network.

More specifically, the intelligent refrigerator performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the intelligent refrigerator receives a signal from the 5G network.

In addition, the intelligent refrigerator performs a random access procedure with the 5G network for UL synchronization acquisition and/or UL transmission. The 5G network can transmit, to the intelligent refrigerator, a UL grant for scheduling transmission of specific information. Accordingly, the intelligent refrigerator transmits the specific information to the 5G network on the basis of the UL grant. In addition, the 5G network transmits, to the intelligent refrigerator, a DL grant for scheduling transmission of 5G processing results with respect to the specific information. Accordingly, the 5G network can transmit, to the intelligent refrigerator, information (or a signal) related to remote control on the basis of the DL grant.

Next, a basic procedure of an applied operation to which a method proposed by the present disclosure which will be described later and URLLC of 5G communication are applied will be described.

As described above, an intelligent refrigerator can receive DownlinkPreemption IE from the 5G network after the intelligent refrigerator performs an initial access procedure and/or a random access procedure with the 5G network. Then, the intelligent refrigerator receives DCI format 2_1 including a preemption indication from the 5G network on the basis of DownlinkPreemption IE. The intelligent refrigerator does not perform (or expect or assume) reception of eMBB data in resources (PRBs and/or OFDM symbols) indicated by the preemption indication. Thereafter, when the intelligent refrigerator needs to transmit specific information, the intelligent refrigerator can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the intelligent refrigerator receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the intelligent refrigerator transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 4:
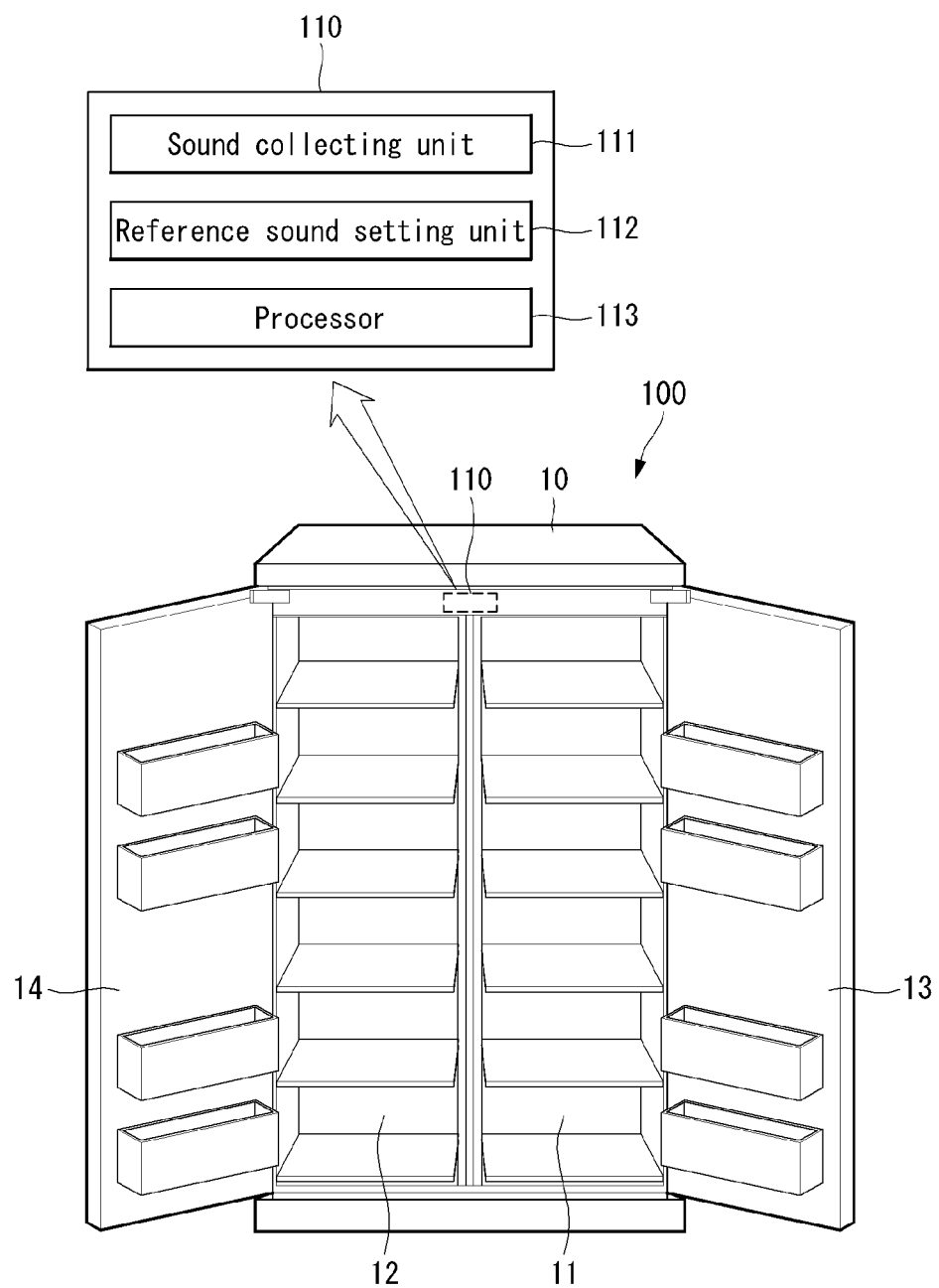
FIG. 4 is a diagram for describing an intelligent refrigerator according to an embodiment of the present disclosure.

FIG. 4 is a diagram for describing an intelligent refrigerator according to an embodiment of the present disclosure.

Referring to FIG. 4, an intelligent refrigerator 100 according to the embodiment of the present disclosure may include a refrigerator body 10 provided with a fridge compartment 11 and a freezer compartment 12, and a fridge compartment door 13 and a freezer compartment door 14 for opening and closing the fridge compartment 11 and the freezer compartment 12 of the refrigerator body 10.

The intelligent refrigerator 100 may include an intelligent inspection device 110. The intelligent inspection device 110 may be mounted on the intelligent refrigerator 100 or be provided as a device separated from the intelligent refrigerator 100. The intelligent refrigerator 100 may be referred to as a refrigerator.

The intelligent inspection device 110 may include a sound collecting unit 111 collecting a first operation sound generated in the refrigerator 100 and storing the collected first operating sound; a reference sound setting unit 112 comparing the first operation sound stored in the sound collecting unit 111 with a preset normal sound of the refrigerator 100, learning a result of the comparison to set a reference sound, and setting a reference sound range based on the set reference sound; and a processor 113 collecting, through the sound collecting unit 111, a second operation sound generated in the refrigerator 100 after the reference sound range has been set, comparing the second operation sound with the reference sound range, and inspecting whether the refrigerator 100 fails based on the result of the comparison.

The first operation sound may be a sound collected for a predetermined time after being first installed or re-installed in a home. That is, the first operation sound may be noise generated in a refrigerator at the first operation after being installed for the first time or re-installed after the move by a skilled engineer. For example, the first operation sound may include at least one of a tremor sound generated in a machine room installed in the refrigerator, a compressor sound generated by a compressor mounted on the refrigerator, a refrigerant sound flowing through a pipe mounted on the refrigerator, and a fan sound generated by a fan mounted on the refrigerator.

The second operation sound may be noise generated in the refrigerator after the reference sound range has been set. When the first operation sound is collected by the sound collecting unit, the processor may control a reference sound setting unit to compare the first operation sound stored in the sound collecting unit with a preset normal sound of the refrigerator, learn a result of the comparison to set a reference sound, and set a reference sound range based on the set reference sound.

The preset normal sound of the refrigerator may be defined as the noise generated in the refrigerator which has been just produced at the factory and thoroughly inspected by the skilled engineer. All refrigerators have the normal sound at substantially the same value within the margin of error.

The reference sound is a result value obtained by learning based on the first operation sound and the normal sound and may have different values depending on the installed place. The reference sound may vary depending on the surrounding environment where the refrigerator is installed. For example, the normal sound of the refrigerator installed in the home and that of the refrigerator installed in the store may be substantially the same as each other, but the reference sound may be different.

Figure 5:
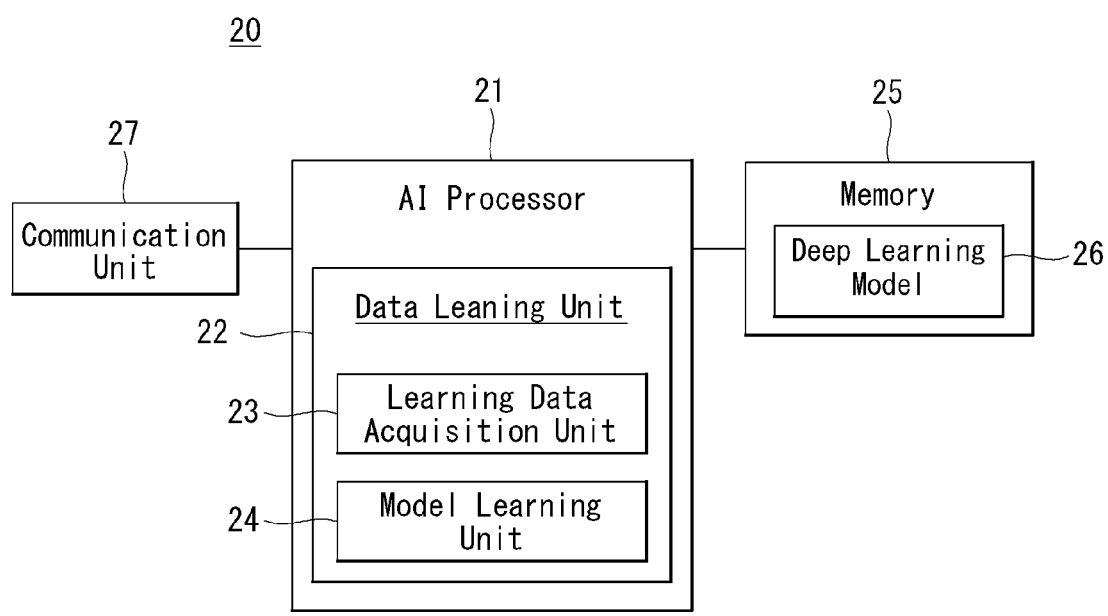
FIG. 5 is a block diagram of an AI device according to an embodiment of the present disclosure.

FIG. 5 is a block diagram of an AI device according to an embodiment of the present disclosure.

An AI device 20 may include an electronic device including an AI module that can perform AI processing, a server including the AI module, or the like. Further, the AI device 20 may be included as at least one component of the intelligent refrigerator 100 shown in FIG. 4 to perform together at least a portion of the AI processing.

The AI processing may include all operations related to driving of the intelligent refrigerator 100 shown in FIG. 4. For example, the artificial intelligent refrigerator 100 can perform operations of processing/determining, and control signal generating by performing AI processing on sensing data. Further, for example, the artificial intelligent refrigerator 100 can control the internal temperature of the refrigerating compartment or the internal temperature of the freezing compartment by performing AI processing on data acquired through interaction with another electronic device disposed in the refrigerator.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to internal temperature of the artificial intelligent refrigerator 100. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, internal temperature data of the refrigerating compartment, internal temperature data of the freezing compartment, and/or external temperature data of the artificial intelligent refrigerator to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selecting unit can select only data about an object included in a specific period as learning data by performing detection for the specific period on data acquired through the internal temperature data of the refrigerating compartment, internal temperature data of the freezing compartment, and/or external temperature data of the artificial intelligent refrigerator.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an intelligent refrigerator. Further, the AI device 20 may be defined as another vehicle or a 5G network that communicates with the intelligent refrigerator. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

Figure 6:
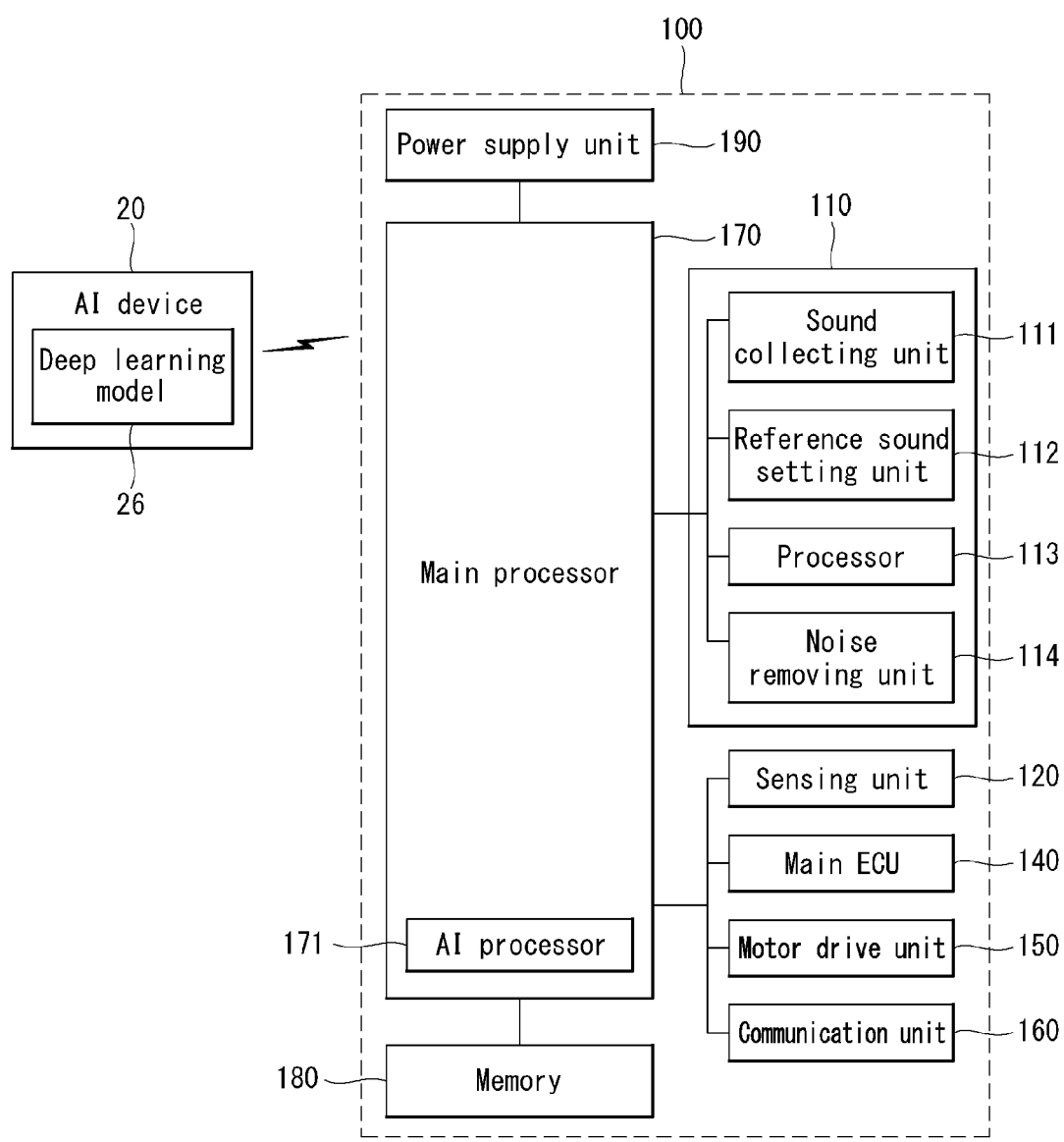
FIG. 6 is a diagram for describing a system in which the intelligent refrigerator is cooperated with the AI device, according to the embodiment of the present disclosure.

FIG. 6 is a diagram for describing a system in which the intelligent refrigerator is cooperated with the AI device, according to the embodiment of the present disclosure.

Referring to FIG. 6, the intelligent refrigerator 100 may transmit data that requires AI processing to the AI device 20 through the communication unit and the AI device 20 including a deep learning model 26 may transmit an AI processing result obtained by using the deep learning model 26 to the intelligent refrigerator 100. The AI device 20 may be seen in FIG. 5.

The intelligent refrigerator 100 may include a memory 180, a main processor 170, and a power supply unit 190, and the main processor 170 may further include an AI processor 171. In addition, the intelligent refrigerator 100 may include an interface unit connected to at least one electronic device provided in the intelligent refrigerator 100 in a wired or wireless manner so as to exchange data required for driving the intelligent refrigerator 100 or controlling internal temperature. Examples of the at least one electronic device connected through the interface unit may include the intelligent inspection device 110, a communication unit 160, a main electronic control unit (ECU) 140, a motor drive unit 150, and a sensing unit 120.

The interface unit may be configured of at least one of a communication module, a terminal, a pin, a cable, a port, a circuit, an element, and a device.

The memory 180 is electrically connected to the main processor 170. The memory 180 may store basic data for the unit, control data for controlling the operation of the unit, and input/output data. The memory 180 may store data processed by the main processor 170. The memory 180 may be hardware including at least one of a read-only memory (ROM), a random-access memory (RAM), an erasable programmable read-only memory (EPROM), a flash drive, and a hard drive. The memory 180 may store various data for the overall operation of the intelligent refrigerator 100, such as a program for processing or controlling the main processor 170. For example, the memory 180 may store the first operation sound, the second operation sound, the normal sound, the reference sound, and the like, which are collected through the sound collecting unit (see FIG. 4) provided in the intelligent inspection device 110.

The memory 180 may be integrated with the main processor 170. According to the embodiment, the memory 180 may be classified into a sub-component of the main processor 170.

The power supply unit 190 may supply power to the intelligent refrigerator 100. The power supply unit 190 may receive power from a power source included in the intelligent refrigerator 100, and supply the power to each of units of the refrigerator. The power supply unit 190 may be operated according to a control signal provided from the main ECU 140. The power supply unit 190 may include a switched-mode power supply (SMPS).

The main processor 170 may be electrically connected to the memory 180, the interface unit, and the power supply unit 190 to exchange signals. The main processor 170 may be implemented using at least one of application-specific integrated circuits (ASICs), digital signal processors (DSPs), digital signal processing devices (DSPDs), programmable logic devices (PLDs), field programmable gate arrays (FPGAs), controllers, micro-controllers, microprocessors, and electrical units for performing other functions.

The main processor 170 may be driven by the power provided from the power supply unit 190. The main processor 170 may receive data, process data, generate a signal, and provide the signal in a state where the power is supplied by the power supply unit 190.

The main processor 170 may receive information from another electronic device in the intelligent refrigerator 100 through the interface unit. The main processor 170 may provide a control signal to another electronic device in the intelligent refrigerator 100 through the interface unit.

The main processor 170 may collect, through the sound collecting unit, the second operation sound generated in the intelligent refrigerator 100 after the intelligent inspection device 110 has set the reference sound range, compare the second operation sound with the reference sound range, and inspect whether the intelligent refrigerator fails based on the result of the comparison. The main processor 170 may be referred to as a refrigerator processor 110 or a refrigerator control unit 110.

The intelligent refrigerator 100 may include at least one printed circuit board (PCB). The memory 180, the interface unit, the power supply unit 190 and the main processor 170 may be electrically connected to the printed circuit board.

Hereinafter, other electronic devices and the AI processor 171 in the main processor 170 connected to the interface unit will be described in more detail.

As described with reference to FIG. 5, the intelligent inspection device 110 may include the sound collecting unit 111, the reference sound setting unit 112, and the processor 113.

The sound collecting unit 111 may collect the first operation sound or the second operation sound generated in the intelligent refrigerator 100, and store the collected first operation sound or second operation sound in the memory 180. At least one sound collecting unit 111 may be disposed in the intelligent refrigerator 100.

The first operation sound of the intelligent refrigerator 100 may be a sound collected for a predetermined time after being first installed or re-installed in a home. For example, the first operation sound of the intelligent refrigerator 100 may be at least one of a tremor sound generated in a machine room (not shown) installed in the intelligent refrigerator 100, a compressor sound generated by a compressor (not shown) mounted on the intelligent refrigerator 100, a refrigerant sound flowing through a pipe (not shown) mounted on the intelligent refrigerator 100, and a fan sound generated by a fan (not shown) mounted on the intelligent refrigerator 100.

The reference sound setting unit 112 may compare the first operation sound stored in the sound collecting unit 111 with a preset normal sound of the refrigerator, learn the result of the comparison to set a reference sound, and set a reference sound range based on the set reference sound.

A noise removing unit 114 may remove noise from the first operation sound or the second operation sound collected through the sound collecting unit 111. The noise removing unit 114 may remove noises or vibrations other than sound sources or vibrations which are the same as or similar to product sound source parameters or product vibration parameters of the product selected, among various noises or vibrations of the surroundings which are collected through the sound collecting unit 111. The noise removing unit 114 may generate inverted versions of the sound waves or waveforms corresponding to the noises or vibrations to be removed and combine the original and inverted sound waves or waveforms with each other, leaving only the sound sources or vibrations corresponding to the selected product.

The processor 113 may compare the second operation sound from which the noise has been removed with the reference sound range to inspect whether the refrigerator is abnormal or fails. For example, the processor 113 may set a reference sound range by using frequency characteristics of a specific product corresponding to the first operation sound or the second operation sound based on the sound source parameter or the vibration parameter. An inspection unit 115 may compare the second operation sound based on the set reference sound range, and inspect whether the refrigerator is abnormal or fails by using a deep learning algorithm based on the result of the comparison.

That is, the processor 113 may collect, through the sound collecting unit 111, the second operation sound generated in the intelligent refrigerator 100 after the reference sound range has been set, compare the second operation sound with the reference sound range, and inspect whether the intelligent refrigerator 100 fails based on the result of the comparison.

The processor 113 may extract a frequency characteristic of the first operation sound or the second operation sound and control the noise removing unit 114 to remove the noise from the first operation sound or the second operation sound based on the extracted frequency characteristic.

On the other hand, the refrigerator 100 may transmit data obtained through at least one sensor to the AI device 20 through the communication unit 160, and the AI device 20 may apply the neural network model 26 to the transmitted data. Then, the AI device 20 may transmit the generated AI processing data to the refrigerator 100. The refrigerator 100 may recognize information on the operation sound based on the received AI processing data, and recognize the failure of the refrigerator by using the information on the recognized operation sound.

In addition, the communication unit 160 may exchange signals with a device positioned outside the refrigerator 100. The communication unit 160 may exchange signals with at least one of a smart device or a smart terminal. The communication unit 160 may include at least one of a transmitting antenna, a receiving antenna, a radio frequency (RF) circuit capable of implementing various communication protocols, and an RF element in order to perform communication.

The main ECU 140 may control overall operations of at least one electronic device provided in the refrigerator 100.

The motor drive unit 150 is a device for electrically controlling various drive devices in the refrigerator 100. For example, the motor drive unit 150 may control a compressor, an evaporator, and a condenser. The motor drive unit 150 may include at least one electronic control device (for example, a control electronic control unit (ECU)).

The sensing unit 120 may sense a state of the refrigerator 100. The sensing unit 120 may include at least one of a temperature sensor, a humidity sensor, an ultrasonic sensor, an illumination sensor, or a sound sensor.

The AI processor 171 may generate AI processing data of the refrigerator 100 by applying a neural network model to sensing data generated by at least one sensor. The AI processing data generated by applying the neural network model may include at least one of a tremor sound generated in a machine room installed in the refrigerator, a compressor sound generated by a compressor mounted on the refrigerator, a refrigerant sound flowing through a pipe mounted on the refrigerator, and a fan sound generated by a fan mounted on the refrigerator.

The refrigerator 100 may transmit the sensing data obtained through at least one sensor to the AI device 20 through the communication unit 160, and the AI device 20 may apply the neural network model 26 to the transmitted sensing data. Then, the AI device 20 may transmit the generated AI processing data to the refrigerator 100.

According to the embodiment, the AI processor 171 may perform a deep learning computation based on a plurality pieces of data sensed by the sensing unit 120 and correct internal temperature data the refrigerator 100 based on the generated AI processing data.

The refrigerator 100 may include an internal communication system (not shown). The plurality of electronic devices included in the refrigerator 100 may exchange signals through an internal communication system 50. The signal may include data. The internal communication system (not shown) may use at least one communication protocol (for example, CAN, LIN, FlexRay, MOST, or Ethernet).

The AI processor 171 may apply at least one sensor provided in the refrigerator 100 and noise-related information received from an external device to the neural network model.

As described above, according to the embodiment of the present disclosure, the overview for performing AI processing by applying 5G communication needed to implement the method for controlling the refrigerator, and transmitting and receiving the AI processing result has been described.

Hereinafter, according to the embodiment of the present disclosure, a specific method for passively or actively inspecting whether the refrigerator 100 fails based on the first operation sound or the second operation sound generated in the refrigerator 100 will be described with reference to the required drawings.

Figure 7:
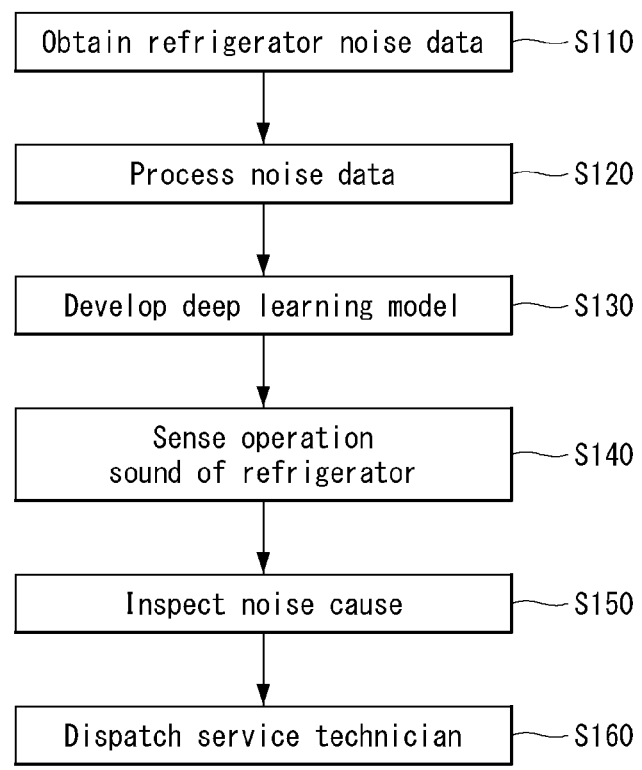
FIG. 7 is a flowchart showing a method for inspecting a refrigerator using the intelligent inspection device according to the embodiment of the present disclosure.

FIG. 7 is a flowchart showing a method for inspecting the refrigerator using the intelligent inspection device according to the embodiment of the present disclosure.

Referring to FIG. 7, the intelligent inspection device may inspect noise in the following order.

The processor may obtain refrigerator noise data through a sound collecting unit mounted on the refrigerator (S110). The processor may obtain the refrigerator noise data by controlling the sound collecting unit to collect the first operation sound or the second operation sound generated in the refrigerator.

The processor may process the obtained refrigerator noise data (S120). The processor may process the obtained refrigerator noise data and classify the processed refrigerator noise data into at least one noise source. That is, the classification into the noise sources may be made depending on noises that are differently generated according to the kinds of failures of the refrigerator.

The processor may develop deep learning of the processed noise data (S130). The processor may include a deep neural network (DNN). The deep neural network (DNN) may be an artificial neural network (ANN) composed of multiple hidden layers between an input layer and an output layer. The deep neural network may model complex non-linear relationships, like the general artificial neural network. For example, in the deep neural network structure for an object identification model, each object may be represented as a layered structure of basic elements of the image. In this case, the additional layers may combine the features of the lower layers gradually collected. This feature of the deep neural network enables modeling of the complex data with fewer units and nodes than the artificial neural network that performs a similar function.

The processor may apply the classified noise source to the deep neural network (DNN) to do learning for each module according to the refrigerator type or the noise source. The processor may apply the classified noise source to the deep neural network (DNN) to collect and learn data in consideration of various environmental conditions.

The processor may sense an operation sound of the refrigerator in real time by using at least one sound collecting unit (S140).

The processor may inspect the sensed first operation sound or the second operation sound (S150). The processor may extract a frequency characteristic of the sensed first operation sound or second operation sound and remove the noise from the first operation sound or the second operation sound based on the extracted frequency characteristic. The processor may compare the frequency characteristic of the extracted first operation sound or second operation sound with a reference sound range, and inspect whether the refrigerator fails based on the result of the comparison.

In addition, the processor may connect communication with a designated server through a network, transmit a result of inspection to the server, and feed back corresponding determination from the server. For example, when the second operation sound is out of the reference sound range, the processor may perform operations including determining that the refrigerator fails, transmitting the result of the inspection to the server through the communication unit, and feeding back corresponding determination.

Alternatively, when the second operation sound is out of the reference sound range, the processor may determine that the refrigerator fails, and display determination corresponding to the result inspected by executing the failure inspection program.

In addition, when the determination of the failure inspection program is not obtained, the processor may transmit, to the server, a result of the inspection through the communication unit and feed back the corresponding determination.

Then, the processor may provide a service technician with information based on the feed-back determination, and reserve the dispatch of the service technician (S160).

Figure 8:
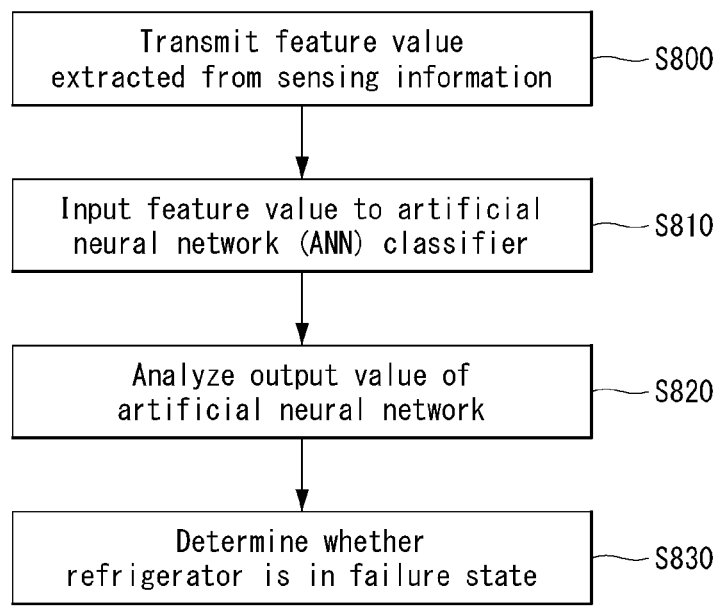
FIG. 8 is a diagram for describing an example of inspecting noise in the embodiment of the present disclosure.

FIG. 8 is a diagram for describing an example of inspecting noise in the embodiment of the present disclosure.

Referring to FIG. 8, the processor may extract feature values from sensing information obtained through at least one sensor to collect various noises generated when the refrigerator operates (S800).

For example, the processor may receive noise information from at least one sensor (for example, a sound collecting unit). The processor 170 may extract the feature value from the noise information. The value of at least one feature that may be extracted from the noise information may be specifically represented by at least one of a tremor sound generated in a machine room installed in the refrigerator, a compressor sound generated by a compressor mounted on the refrigerator, a refrigerant sound flowing through a pipe mounted on the refrigerator, and a fan sound generated by a fan mounted on the refrigerator, which are generated during operation of the refrigerator. For example, the tremor sound generated in the machine room may be a hum sound, which is a trembling sound. The compressor sound may be a crack sound, which is an iron grinding sound. The refrigerant sound may be a sound of flowing water or a boiling sound. The fan sound may be similar to a whistling sound or a ghost sound.

The processor may perform control such that the feature values are input to an artificial neural network (ANN) classifier trained to distinguish whether the refrigerator is in a failure state or a normal state (S810).

The processor may generate failure information of the refrigerator by combining the extracted feature values. The failure information may be input to the artificial neural network (ANN) classifier trained to distinguish whether the refrigerator is in the failure state based on the extracted feature value.

The processor 170 may analyze an output value of the artificial neural network (S820), and determine whether the refrigerator is in the failure state based on the analyzed output value of the artificial neural network (S830).

The processor 170 may determine whether the refrigerator is in the failure state or the normal state from the output of the ANN classifier.

On the other hand, in FIG. 8, the example in which the operation of determining whether the refrigerator fails through AI processing is implemented in the processing of the intelligent inspection device has been described, but the present disclosure is not limited thereto. For example, AI processing may be performed on a 5G network based on sensing information received from the intelligent inspection device.

Figure 9:
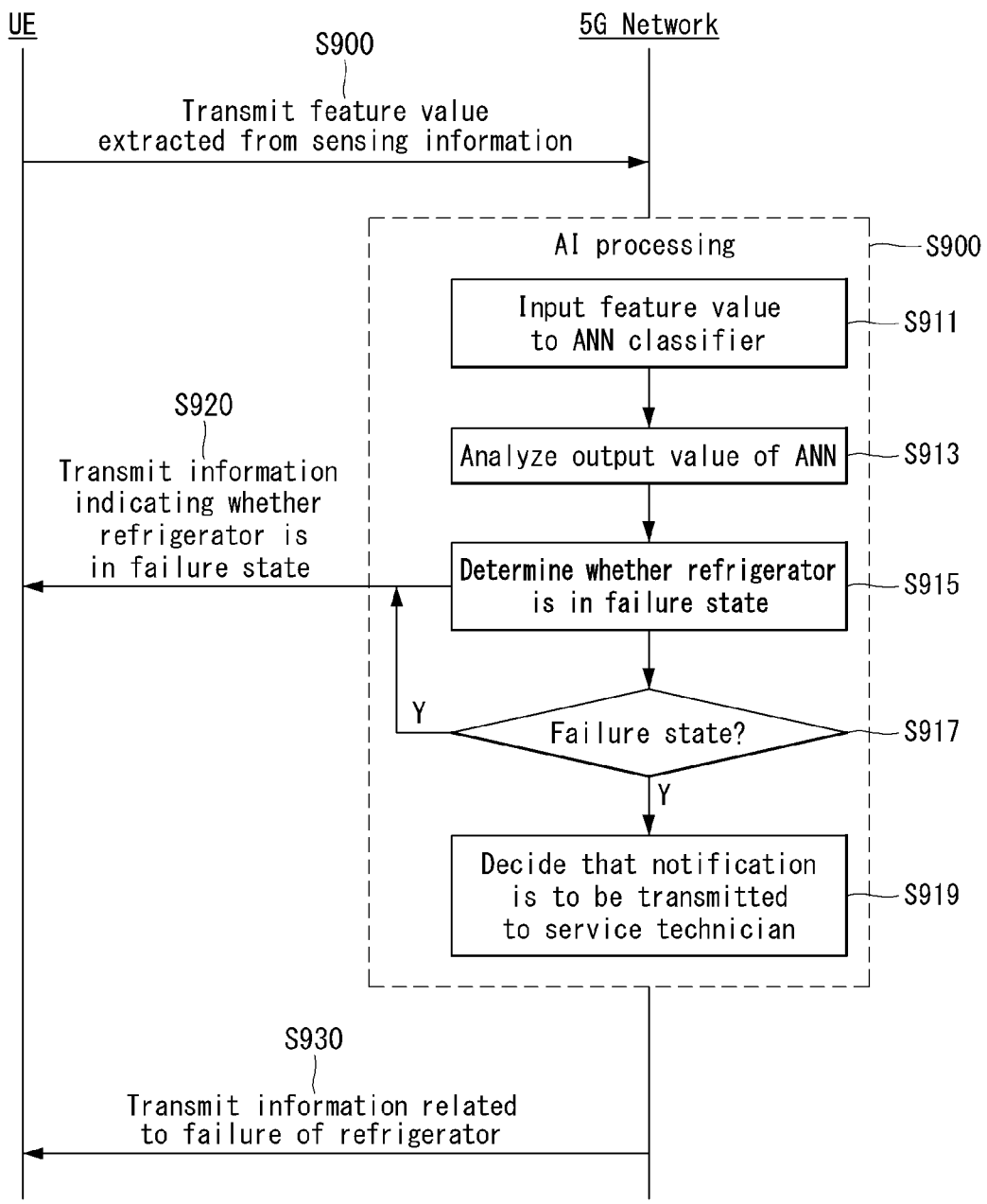
FIG. 9 is a diagram for describing another example of a method for inspecting a refrigerator using the intelligent inspection device according to the embodiment of the present disclosure.

FIG. 9 is a diagram for describing another example of determining whether the refrigerator fails in the embodiment of the present disclosure.

The processor may control the communication unit so as to transmit the noise information of the refrigerator to an AI processor included in the 5G network. In addition, the processor 170 may control the communication unit so as to receive AI processing information from the AI processor.

The AI processing information may be information indicating the determination for whether the refrigerator is in a failure state or a normal state.

On the other hand, the intelligent inspection device may perform an initial access procedure with a 5G network in order to transmit information indicating whether the refrigerator is in the failure state to the 5G network. The intelligent inspection device may perform the initial access procedure with the 5G network based on a synchronization signal block (SSB).

In addition, the intelligent inspection device may receive, from the network, downlink control information (DCI), where the DCI is used to schedule transmission of information indicating whether the refrigerator is in the failure state, which is obtained from at least one sensor provided in the intelligent inspection device through the wireless communication unit.

The processor 170 may transmit, to the network, the information indicating whether the refrigerator is in the failure state based on the DCI.

The information indicating whether the refrigerator is in the failure state may be transmitted to the network through the PUSCH, and the DM-RS of the SSB and the PUSCH may be QCLed for QCL type D.

Referring to FIG. 9, the intelligent inspection device may transmit a feature value extracted from sensing information to a 5G network (S900).

Here, the 5G network may include an AI processor or an AI system, and the AI system of the 5G network may perform the AI processing based on the received sensing information (S910).

The AI system may input feature values received from the intelligent inspection device into the ANN classifier (S911). The AI system may analyze an output value of the ANN (S913), and determine whether the refrigerator is in a failure state or in a normal state of based on the output value of the ANN (S915). The 5G network may transmit the information on the state of the refrigerator determined by the AI system to the refrigerator or the intelligent inspection device through the wireless communication unit.

Here, the information on the state of the refrigerator may indicate whether the refrigerator is in a failure state or a normal state.

When determination is made that the refrigerator is in a failure state (S917), the AI system may display an inspection value corresponding thereto.

When determination is made that the refrigerator is in a failure state, the AI system may decide that a notification signal is to be transmitted to a service technician (S919). In addition, the AI system may transmit information (or signals) related to the notification signal to the intelligent inspection device.

On the other hand, the intelligent inspection device may transmit only the sensing information to the 5G network, and extract a feature value corresponding to an overload detection input, which is used as an input of the artificial neural network for determining whether the load is in the overload state from the sensing information in the AI system included in the 5G network.

Figure 10:
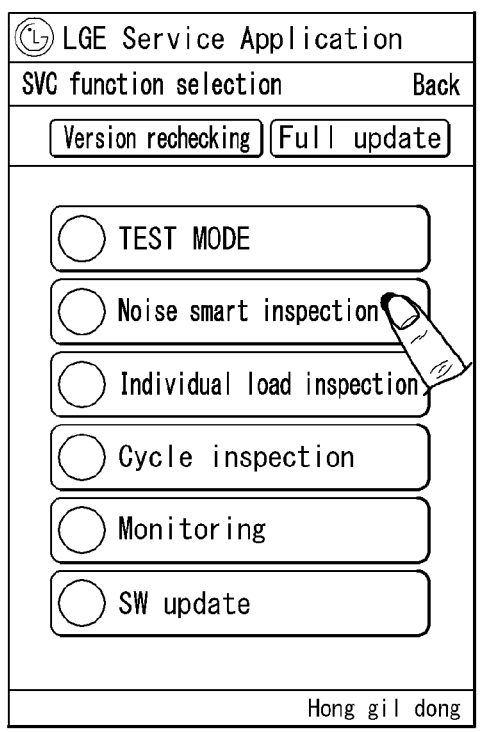
FIG. 10 is a diagram for describing the noise measurement of the refrigerator according to the embodiment of the present disclosure.
Figure 10:
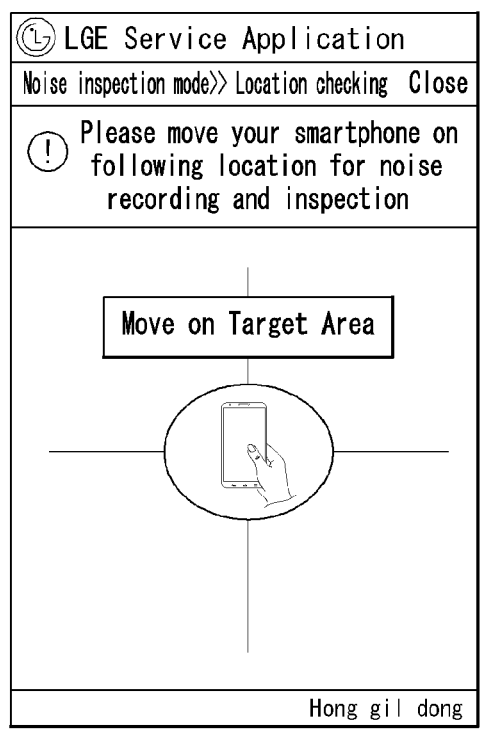

FIG. 10 is a diagram for describing the noise measurement of the refrigerator according to the embodiment of the present disclosure. FIG. 11 is a diagram for describing a result display of inspection according to the embodiment of the present disclosure.

Although the intelligent inspection device has been described as being mounted on the refrigerator, the present disclosure is not limited thereto. The intelligent inspection device may be provided as a device separated from the refrigerator.

As shown in FIGS. 10 and 11, the intelligent inspection device separated from the refrigerator may measure the noise of the refrigerator. The intelligent inspection device may be a smart device used by a user.

The intelligent inspection device may execute a failure inspection program application (app). The intelligent inspection device may measure the noise of the refrigerator by varying the distance from the refrigerator according to an instruction of the executing app. To this end, the intelligent inspection device may apply an AR-based noise measurement location guide and measure the noise from the front of the refrigerator. In addition, the intelligent inspection device may precisely measure the noise at a location close to the noise source generated in the refrigerator.

The intelligent inspection device may learn the measured noise of the refrigerator and display the inspection contents corresponding to the result of the learning. That is, the intelligent inspection device may display the inspection contents when the determination is made that the user can directly repair the refrigerator from the result of the inspection contents. The moving image may be displayed so that the user can directly repair the broken part.

On the other hand, when the determination is made that the user cannot directly repair the refrigerator from the result of the inspection contents, the intelligent inspection device may display the result of the inspection contents and call a service technician.

As described above, the present disclosure relates to noise inspection of a refrigerator and service therefor, where, when a customer complains about the noise of the refrigerator, the customer may measure the noise through an App based on a learning model obtained through deep learning about noise that may be generated in the refrigerator, and inspect abnormality and find the cause of the noise based on the learning model.

In order to find the cause of the noise, by executing a smartphone App to record the noise, the noise may be calculated as a sound quality index in the time or frequency domain for a particular section, and the measurement position may be implemented in the form of providing a guide that may be measured at any position in front of the refrigerator or near the AR-based refrigerator noise source. In addition, the fact that the noise source has been found by the failure inspection or abnormal inspection is received by the cloud server, and the service technician may take action on the defect. In this way, it is possible to take clear measures against emotional dissatisfactions that are not identified when the complaint about refrigerator noise is received, and to give customers trust through clear cause analysis. In addition, inspection without additional sensors makes it possible to contribute to brand recognition and commercialization.

The present disclosure described above may be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

What is claimed is:

1. A device comprising:
a memory: and
one or more processors configured to:
   store in the memory a first operation sound generated by a refrigerator;
   compare the first operation sound with a preset normal sound of the refrigerator;
   set a reference sound as a result of the compare;
   set a reference sound range based on the set reference sound;
   store in the memory a second operation sound generated by the refrigerator after the set the reference sound range;
   compare the second operation sound with the reference sound range; and
   determine a state of the refrigerator based on a result of the compare the second operation sound with the reference sound range,
   wherein the reference sound is a result value obtained by learning based on the first operation sound and the normal sound and has different values depending on a surrounding environment where the refrigerator is located.

2. The device of claim 1, wherein the one or more processors are further configured to remove noise from the first operation sound or the second operation sound.

3. The device of claim 2, wherein the one or more processors are further configured to:
extract a frequency characteristic of the first operation sound or the second operation sound; and
remove the noise from the first operation sound or the second operation sound based on the extracted frequency characteristic.

4. The device of claim 3, wherein the one or more processors are further configured to set the frequency characteristic differently according to a distance from the refrigerator.

5. The device of claim 2, further comprising a communication unit configured to:
communicate with a designated server through a network;
transmit the determined state of the refrigerator to the server; and
feed back corresponding determination from the server.

6. The device of claim 5, wherein the one or more processors are further configured to:
determine that the refrigerator is in a failure state when the second operation sound is out of the reference sound range; and transmit information regarding the determined failure state to the server via the communication unit and feed back corresponding determination.

7. The device of claim 5, wherein the one or more processors are further configured to:
   determine that the refrigerator is in a failure state when the second operation sound is out of the reference sound range; and
   execute a failure inspection program to display information regarding the determined failure state.

8. The device of claim 7, wherein the one or more processors are further configured to:
   transmit the information regarding the failure state to the server via the communication unit; and
   feed back the corresponding determination from the server when no result is retrieved from the failure inspection program.

9. The device of claim 1, wherein the first operation sound of the refrigerator is a sound collected for a predetermined period of time after the refrigerator is installed first time or re-installed at a place.

10. The device of claim 1, wherein the first operation sound of the refrigerator is at least one of:
    a trembling sound generated from a machine room in the refrigerator;
    a sound generated by a compressor mounted in the refrigerator;
    a sound of a refrigerant flowing through a pipe mounted in the refrigerator; or
    a sound generated by a fan mounted in the refrigerator.

11. The device of claim 1, wherein the one or more processors are further configured to:
    receive, from a network, downlink control information (DCI) to be used for scheduling transmission of information regarding the determined state of the refrigerator; and
    transmit the information regarding the determined state of the refrigerator to the network based on the DCI.

12. The device of claim 11, wherein the one or more processors are further configured to:
    perform an initial access procedure with the network based on a synchronization signal block (SSB); and
    transmit information regarding the determined state of the refrigerator to the network through a physical uplink shared channel (PUSCH), and
    wherein demodulation reference signals (DM-RS) of the SSB and the PUSCH are quasi co-located (QCLed) for QCL type D.

13. The device of claim 11, further comprising a communication unit, wherein the one or more processors are further configured to:
    control the communication unit to transmit the information regarding the determined state of the refrigerator to an artificial intelligent (AI) processor in the network; and
    control the communication unit to receive AI processing information from the AI processor, and
    wherein the AI processing information comprises information indicating that a failure state or an abnormal state of the refrigerator is determined.

14. A refrigerator comprising:
    a main body including a fridge compartment and a freezer compartment; and
    an intelligent inspection device mounted on the main body and comprising a memory and one or more processors configured to:
    store in the memory a first operation sound generated by the refrigerator;
    compare the first operation sound with a preset normal sound of the refrigerator;
    set a reference sound as a result of the compare;
    set a reference sound range based on the set reference sound;
    store in the memory a second operation sound generated by the refrigerator after the set the reference sound range;
    compare the second operation sound with the reference sound range; and
    determine a state of the refrigerator based on a result of the compare the second operation sound with the reference sound range,
    wherein the reference sound is a result value obtained by learning based on the first operation sound and the normal sound and has different values depending on a surrounding environment where the refrigerator is located.

15. The refrigerator of claim 14, wherein the one or more processors are further configured to remove noise from the first operation sound or the second operation sound.

16. The refrigerator of claim 15, wherein the one or more processors are further configured to:
    extract a frequency characteristic of the first operation sound or the second operation sound; and
    remove the noise from the first operation sound or the second operation sound based on the extracted frequency characteristic.

17. The refrigerator of claim 15, wherein the intelligent inspection device further comprises a communication unit configured to:
    communicate with a designated server through a network;
    transmit the determined state of the refrigerator to the server; and
    feed back corresponding determination from the server.

18. The refrigerator of claim 14, wherein the first operation sound of the refrigerator is a sound collected for a predetermined period time after the refrigerator is installed first time or re-installed at a place.

19. The refrigerator of claim 18, wherein the one or more processors are further configured to:
    determine that the refrigerator is in a failure state when the second operation sound is out of the reference sound range; and
    transmit information regarding the determined failure state to the server via the communication unit and feed back corresponding determination.

20. The refrigerator of claim 18, wherein the one or more processors are further configured to:
    determine that the refrigerator is in a failure state when the second operation sound is out of the reference sound range; and
    execute a failure inspection program to display information regarding the determined failure state.

21. The refrigerator of claim 20, wherein the one or more processors are further configured to:
    transmit the information regarding the failure state to the server via the communication unit; and
    feed back the corresponding determination from the server when no result is retrieved from the failure inspection program.

22. The refrigerator of claim 14, wherein the first operation sound of the refrigerator is at least one of:
    a trembling sound generated from a machine room in the refrigerator;

a sound generated by a compressor mounted in the refrigerator;

a sound of a refrigerant flowing through a pipe mounted in the refrigerator; or a sound generated by a fan mounted in the refrigerator.

23. The refrigerator of claim 17, wherein the one or more processors are further configured to set the frequency characteristic differently according to a distance from the refrigerator.

24. The refrigerator of claim 14, wherein the one or more processors are further configured to:

receive, from a network, downlink control information (DCI) to be used for scheduling transmission of information regarding the determined state of the refrigerator; and transmit the information regarding the determined state of the refrigerator to the network based on the DCI.

25. The refrigerator of claim 24, wherein the one or more processors are further configured to:

perform an initial access procedure with the network based on a synchronization signal block (SSB); and transmit information regarding the determined state of the refrigerator to the network through a physical uplink shared channel (PUSCH), and wherein demodulation reference signals (DM-RS) of the SSB and the PUSCH are quasi co-located (QCLed) for QCL type D.

26. The refrigerator of claim 24, wherein the intelligent inspection device further comprises a transceiver and the one or more processors are further configured to:

control the transceiver to transmit the information regarding the determined state of the refrigerator to an artificial intelligent (AI) processor in the network; and control the transceiver to receive AI processing information from the AI processor, and wherein the AI processing information comprises information indicating that a failure state or an abnormality state of the refrigerator is determined.

27. The refrigerator of claim 14, wherein the second operation sound is collected to be stored when a note-on function of the refrigerator is turned on.

* * * * *